US011580757B2

(12) United States Patent
Yang et al.

(10) Patent No.: US 11,580,757 B2
(45) Date of Patent: Feb. 14, 2023

(54) FATIGUE STATE DETECTION METHOD AND APPARATUS, MEDIUM, AND ELECTRONIC DEVICE

(71) Applicant: Shenzhen Horizon Robotics Technology Co., Ltd., Shenzhen (CN)

(72) Inventors: Cong Yang, Shenzhen (CN); Zhenyu Yang, Shenzhen (CN); Weiyu Li, Shenzhen (CN)

(73) Assignee: Shenzhen Horizon Robotics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/528,479

(22) Filed: Nov. 17, 2021

(65) Prior Publication Data
US 2022/0180110 A1   Jun. 9, 2022

(30) Foreign Application Priority Data

Dec. 3, 2020 (CN) .......................... 202011395029.6

(51) Int. Cl.
*G06V 20/59* (2022.01)
*G06V 40/16* (2022.01)
*G06V 20/40* (2022.01)
*B60W 40/08* (2012.01)

(52) U.S. Cl.
CPC ........... *G06V 20/597* (2022.01); *B60W 40/08* (2013.01); *G06V 20/46* (2022.01); *G06V 20/48* (2022.01); *G06V 40/165* (2022.01); *G06V 40/171* (2022.01); *B60W 2040/0818* (2013.01); *B60W 2540/229* (2020.02)

(58) Field of Classification Search
None
See application file for complete search history.

(56) References Cited

U.S. PATENT DOCUMENTS

| | | | |
|---|---|---|---|
| 2019/0212969 A1* | 7/2019 | Kobayashi | G06F 3/16 |
| 2020/0057487 A1* | 2/2020 | Sicconi | G06T 7/254 |
| 2020/0320319 A1* | 10/2020 | Wu | G06V 40/176 |

* cited by examiner

*Primary Examiner* — Thomas S McCormack
(74) *Attorney, Agent, or Firm* — Bret E. Field; Bozicevic, Field & Francis LLP

(57) ABSTRACT

Disclosed are a fatigue state detection method and apparatus, a medium and a device. The method includes: obtaining image blocks containing an organ area of a target object from a plurality of video frames collected by a camera apparatus disposed in a mobile device, to obtain an image-block sequence that is based on the organ area; determining a fatigue state type of the target object based on the image-block sequence of the organ area; sending the image-block sequence to a cloud server if the fatigue state type meets a first preset type, and rendering the cloud server to detect a fatigue level of the target object based on the image-block sequence; and receiving fatigue level information about the target object that is returned by the cloud server. The present disclosure may improve accuracy of fatigue state detection, thereby helping to improve driving safety of the mobile device.

18 Claims, 5 Drawing Sheets

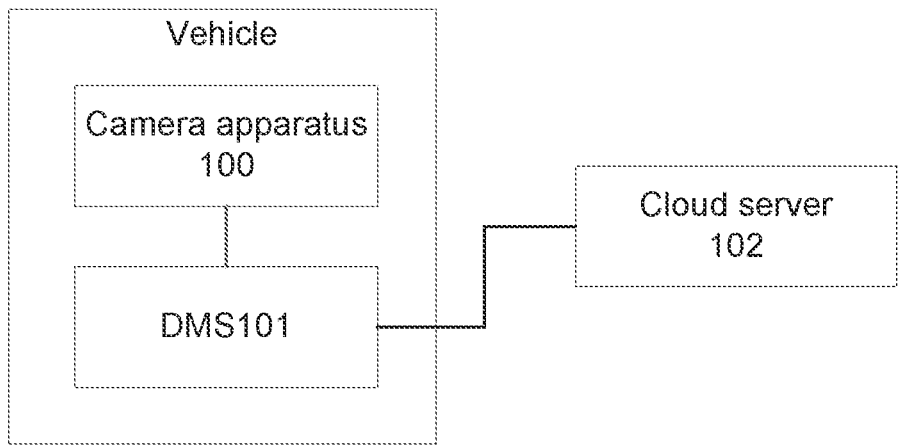

FIG. 1

```
S200. Obtaining image blocks containing an organ area of a
target object from a plurality of video frames collected by a
camera apparatus disposed in a mobile device, to obtain an
image-block sequence that is based on the organ area
```
↓
```
S201. Determining a fatigue state type of the target object
based on the image-block sequence
```
↓
```
S202. Sending the image-block sequence to a cloud server if
the fatigue state type meets a first preset type, thereby
rendering the cloud server to detect a fatigue level of the
target object based on the image-block sequence
```
↓
```
S203. Receiving fatigue level information about the target
object that is returned by the cloud server
```

FIG. 2

S300. Respectively extracting key points for the plurality of video frames collected by a camera apparatus disposed in a mobile device, to obtain face key points of a target object

↓

S301. For any video frame in a plurality of video frames, determining an organ area of the target object based on corresponding organ key points in the face key points of the target object in the video frame, and obtain an image block containing the corresponding organ area of the target object from the video frame

FIG. 3

S400. Obtaining confidence for which a target object is respectively at each fatigue level contained in a second preset type based on an image-block sequence that is based on an organ area

↓

S401. Determining a fatigue state type of the target object based on a first threshold of each fatigue level, a second threshold of each suspected fatigue level, and the confidence

FIG. 4

S500. Respectively performing face recognition on a plurality of video frames, to obtain a face identifier of a target object in the plurality of video frames

↓

S501. Obtaining a first dedicated threshold of each fatigue level and a second dedicated threshold of each suspected fatigue level that correspond to the face identifier

↓

S502. Determining a fatigue state type of the target object based on the first dedicated threshold, the second dedicated threshold, and confidence for which the target object is respectively at each fatigue level contained in a second preset type

FIG. 5

FATIGUE STATE DETECTION METHOD AND APPARATUS, MEDIUM, AND ELECTRONIC DEVICE

RELATED APPLICATION INFORMATION

This application claims priority to Chinese patent application No. 202011395029.6, filed on Dec. 3, 2020, incorporated herein by reference.

FIELD OF THE INVENTION

The present disclosure relates to computer vision technologies, and in particular, to a fatigue state detection method, a fatigue state detection apparatus, a storage medium, and an electronic device.

BACKGROUND OF THE INVENTION

In the field of driving, fatigue driving of a driver is a potential trouble in a driving process of a mobile device such as a vehicle, and has relatively great impact on safe driving of the mobile device. Therefore, performing fatigue state detection to the driver is an important content of a driver monitoring system (DMS). Compared with the conventional contact-based fatigue state detection technology, the fatigue state detection technology based on computer vision is easy for using and has relatively low implementation costs, and thus is widely applied.

A fatigue state detection process based on computer vision is usually: taking a picture for a driver by using a camera apparatus disposed in a mobile device; providing a video frame collected by the camera apparatus to the DMS in a real-time manner; and processing the received video frame by the DMS to determine whether the driver is currently in a fatigue state.

How to accurately recognize a current fatigue state of the driver to ensure safe driving of the mobile device is a technical problem worthy of attention.

SUMMARY OF THE INVENTION

To resolve the foregoing technical problem, the present disclosure is proposed. Embodiments of the present disclosure provide a fatigue state detection method and apparatus, a storage medium, and an electronic device.

According to an aspect of the embodiments of the present disclosure, there is provided a fatigue state detection method, including: obtaining image blocks containing an organ area of a target object from a plurality of video frames collected by a camera apparatus disposed in a mobile device, to obtain an image-block sequence that is based on the organ area; determining a fatigue state type of the target object based on the image-block sequence; sending the image-block sequence to a cloud server if the fatigue state type meets a first preset type, thereby rendering the cloud server to detect a fatigue level of the target object based on the image-block sequence; and receiving fatigue level information about the target object that is returned by the cloud server.

According to another aspect of an embodiment of the present disclosure, there is provided a fatigue state detection apparatus, including: a sequence obtaining module configured to obtain image blocks containing an organ area of a target object from a plurality of video frames collected by a camera apparatus disposed in a mobile device, to obtain an image-block sequence that is based on the organ area; a type determining module configured to determine a fatigue state type of the target object based on the image-block sequence obtained by the sequence obtaining module; a judgment module configured to send the image-block sequence to a cloud server if the fatigue state type determined by the type determining module meets a first preset type, thereby rendering the cloud server to detect a fatigue level of the target object based on the image-block sequence; and a receive module configured to receive fatigue level information about the target object that is returned by the cloud server.

According to still another aspect of the embodiments of the present disclosure, there is provided a computer-readable storage medium, wherein the storage medium stores a computer program used to implement the foregoing method.

According to still another aspect of the embodiments of the present disclosure, there is provided an electronic device, including: a processor; and a memory configured to store processor-executable instructions, wherein the processor is configured to read the executable instructions from the memory and execute the instructions to implement the foregoing method.

According to the fatigue state detection method and apparatus provided in the foregoing embodiments of the present disclosure, the image-block sequence is sent to the cloud server when the mobile device determines that the fatigue state type of the target object meets the first preset type, so that the cloud server may provide the fatigue level of the target object to the mobile device based on the image-block sequence. In this way, fatigue state detection with end-cloud combination is performed. Because a compute resource of the cloud server is more powerful than that of the mobile device, the cloud server can perform more accurate fatigue state detection on the image-block sequence. This is helpful for improving accuracy of fatigue detection, thereby helping to improve driving safety of the mobile device. In addition, the information sent to the cloud server by the mobile device end is an image-block sequence that only includes the organ area of the target object rather than a video frame containing a face area of the target object. Therefore, data volume for transmitting an image to the cloud server by the mobile device end can be reduced while user privacy is protected.

The technical solutions of the present disclosure are further described in detail below with reference to the accompanying drawings and embodiments.

BRIEF DESCRIPTION OF THE DRAWINGS

By describing the embodiments of the present disclosure more detailed with reference to the accompanying drawings, the foregoing and other objectives, features, and advantages of the present disclosure will become more apparent. The accompanying drawings are used to provide further understanding of the embodiments of the present disclosure, constitute a part of the specification, and are used to explain the present disclosure together with the embodiments of the present disclosure, but they do not constitute limitation to the present disclosure. In the accompanying drawings, the same reference numerals generally represent the same components or steps.

FIG. 1 is a schematic diagram of an application scenario of fatigue state detection according to a technical solution of the present disclosure;

FIG. 2 is a flowchart of a fatigue state detection method according to an embodiment of the present disclosure;

FIG. 3 is a flowchart of obtaining an image block containing a corresponding organ area of a target object according to an embodiment of the present disclosure;

FIG. 4 is a flowchart of determining a fatigue state type of a target object according to an embodiment of the present disclosure;

FIG. 5 is a flowchart of determining a fatigue state type of a target object according to another embodiment of the present disclosure;

DETAILED DESCRIPTION OF THE EMBODIMENTS

Figure 6:
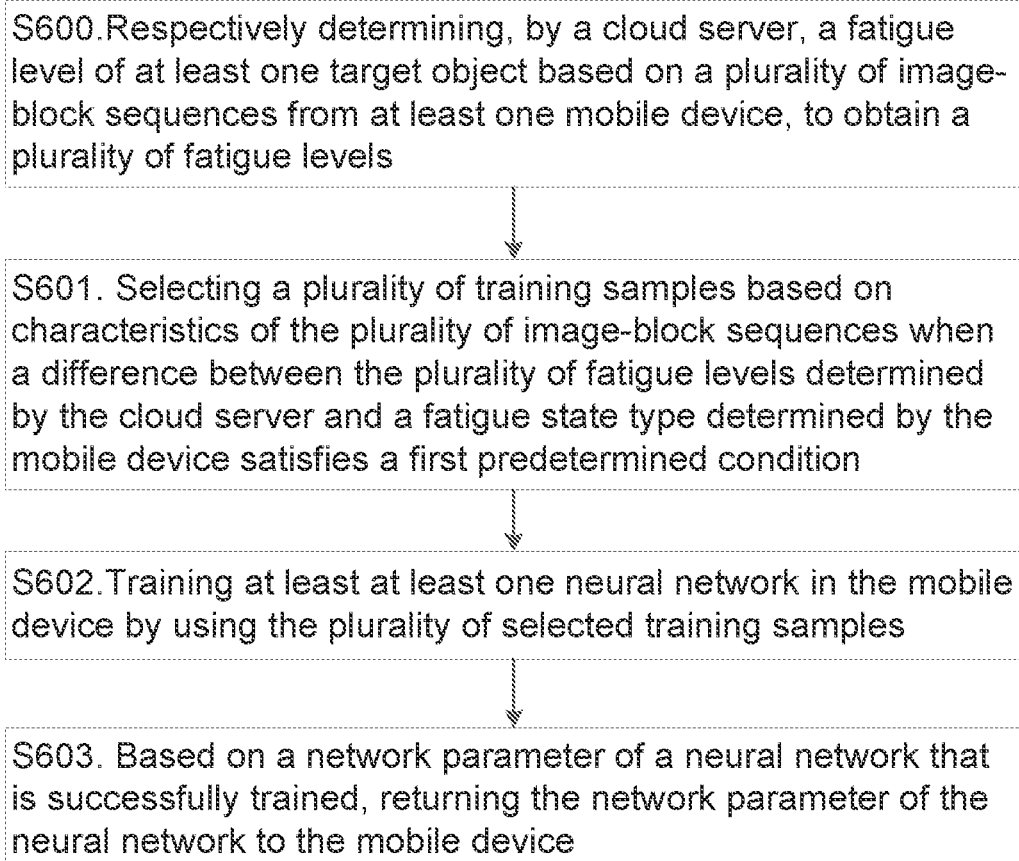
FIG. 6 is a flowchart of returning a network parameter of a neural network to a mobile device by a cloud server according to an embodiment of the present disclosure.

Exemplary embodiments of the present disclosure are described below in detail with reference to the accompanying drawings. Obviously, the described embodiments are merely one part, rather than all of embodiments of the present disclosure. It should be understood that the present disclosure is not limited by the exemplary embodiments described herein.

It should be noted that unless otherwise specified, the scope of the present disclosure is not limited by relative arrangement of components and steps, numeric expressions, and numerical values described in these embodiments.

A person skilled in the art may understand that terms such as "first" and "second" in the embodiments of the present disclosure are merely used to distinguish between different steps, devices, or modules, and indicate neither any particular technical meaning, nor necessarily logical ordering among them.

It should be further understood that, in the embodiments of the present disclosure, the term "multiple"/"a plurality of" may refer to two or more; and the term "at least one" may refer to one, two, or more.

It should be further understood that, any component, data, or structure involved in the embodiments of the present disclosure may be generally construed to one or more, unless it is clearly defined or the context indicates otherwise.

In addition, the term "and/or" in the present disclosure refers to only association relationships that describe associated objects, indicating presence of three relationships. For example, A and/or B may indicate presence of three cases: A alone, both A and B, and B alone. In addition, the character "/" in the present disclosure generally indicates an "or" relationship of associated objects.

It should be further understood that, the descriptions of the various embodiments of the present disclosure focus on differences among the various embodiments. The same or similar parts among the embodiments may refer to one another. For concision, description is not repeated.

Meanwhile, it should be understood that, for ease of description, the accompanying drawings are not necessarily to scale in size of any of parts shown therein.

Descriptions of at least one exemplary embodiment below are actually illustrative only, and never serve as any limitation to the present disclosure long with application or use thereof.

Technologies, methods, and devices known by a person of ordinary skills in the related fields may not be discussed in detail herein. However, where appropriate, the technologies, the methods, and the devices shall be regarded as a part of the specification.

It should be noted that, similar signs and letters in the following accompanying drawings indicate similar items. Therefore, once a certain item is defined in one of the accompanying drawings, there is no need to further discuss the item in the subsequent accompanying drawings.

The embodiments of the present disclosure may be applicable to a terminal device, a computer system, a server, and other electronic devices, which may be operated together with numerous other general-purpose or special-purpose computing system environments or configurations. Well-known examples of the terminal device, the computing system, and environment and/or configuration applicable to be used with the terminal device, the computer system, the server, and other electronic devices include but are not limited to: a personal computer system, a server computer system, a thin client, a thick client, a handheld or laptop device, a microprocessor-based system, a set-top box, programmable consumer electronics, a network personal computer, a small computer systems, a mainframe computer system, and a distributed cloud computing technology environment including any of the foregoing systems, and the like.

The terminal device, the computer system, the server, and other electronic devices may be described in general context of computer system-executable instructions (such as a program module) executed by the computer system. Generally, the program module may include a routine, a program, a target program, a component, logic, a data structure, and the like that execute particular tasks or implement particular abstract data types. The computer system/server may be implemented in a distributed cloud computing environment. In the distributed cloud computing environment, a task may be executed by a remote processing device linked through a communications network. In the distributed cloud computing environment, the program module may be located on a storage medium of a local or remote computing system including a storage device.

Overview of the Present Disclosure

In a process of implementing the present disclosure, the inventor finds that a DMS in a mobile device usually detects a fatigue state based on a preset threshold. For example, after the DMS performs corresponding processing on a video frame collected by a camera apparatus, the preset threshold may be used to measure a processing result, so as to determine whether a driver is in a severe fatigue state, a moderate fatigue state, a slight fatigue state, or a non-fatigue state.

In practical applications, usually there is a relatively fuzzy state change instead of an obvious state change between different fatigue states, and compute resources of the DMS are much limited. Therefore, it is generally difficult for the DMS to accurately determine a relatively fuzzy state change. If a threshold is set too high, a detection of the fatigue state may be missed; and if the threshold is set too low, a detection of the fatigue state may be false.

If a cloud server can be used to assist the DMS to detect the fatigue state, accuracy of the fatigue state detection may be improved.

Exemplary Overview

The technical solutions of fatigue state detection in the present disclosure may be applied to a plurality of scenarios.

For example, the technical solutions of the fatigue state detection provided in the present disclosure may be applied to DMS applications. An example is shown in FIG. 1.

Applications of the fatigue state detection technology in the present disclosure are described below with reference to FIG. 1.

In FIG. 1, a mobile device is exemplarily illustrated as a vehicle. A vehicle is configured with at least one camera apparatus 100 and a DMS 101. A video frame collected by the camera apparatus 100 may be provided to the DMS 101 in a real-time manner. When a driver is at a driving position of the vehicle, the face of the driver needs to be within a field of view of the camera apparatus 100. In other words, a video collected by the camera apparatus 100 usually includes areas such as a face portion (such as the front face) of the driver.

The DMS 101 performs fatigue state detection on each video frame transmitted by the camera apparatus 100 in a real-time manner, to determine whether the driver is currently in a fatigue state.

When the DMS 101 determines that the driver is currently in a fatigue state, the driver may be reminded by opening a vehicle window at the position of the driver, turning on a cold-air system in the vehicle, turning on a music playback function, or turning on a voice greeting function, to ensure safe driving of the vehicle.

When the DMS 101 determines that the driver is currently in a suspected fatigue state, corresponding image information and the like may be provided to a cloud server 102, so that the cloud server 102 performs more accurate fatigue state detection on the received image information and the like by using a more powerful compute resource thereof.

When determining, based on the received image information and the like, that the driver is in a fatigue state, the cloud server 102 may notify the DMS 101 in time. The DMS 101 reminds the driver by opening a vehicle window at the position of the driver, turning on a cold-air system in the vehicle, turning on a music playback function, or turning on a voice greeting function, to ensure safe driving of the vehicle.

When determining, based on the received image information and the like, that the driver is not in a fatigue state, the cloud server 102 may notify the DMS 101 in time, so that the DMS 101 learns that the driver is currently in a non-fatigue state.

The loud server 102 may store the received image information and the like. The stored information may be used for updating parameters of the DM S101 and the cloud server 102.

Exemplary Method

FIG. 2 is a flowchart of a fatigue state detection method according to an embodiment of the present disclosure. The method shown in FIG. 2 includes S200, S201, S202, and S203. The steps are described separately below.

In step S200, image blocks containing an organ area of a target object from a plurality of video frames collected by a camera apparatus disposed in a mobile device are obtained, to obtain an image-block sequence that is based on the organ area.

Step S200 in the present disclosure is performed at a mobile device end. The mobile device in the present disclosure may be a vehicle capable of carrying people, for example, a private car or a public vehicle. The target object in the present disclosure usually refers to a driver of the mobile device. Certainly, the target object may also refer to another people in the mobile device, such as the person in a passenger seat.

When the target object is the driver of the mobile device, the camera apparatus in the present disclosure may be mounted on a steering column of the mobile device or an A-pillar at a driver side, etc. Mounting position of the camera apparatus needs to ensure that a face portion (such as the front face) of the driver at a driving position is within a field of view of the camera apparatus.

The camera apparatus in the present disclosure may be an RGB (red, green, and blue)-based camera apparatus or an IR (infrared radiation)-based camera apparatus. In addition, the camera apparatus may be a monocular camera apparatus or a binocular camera apparatus.

The plurality of video frames in the present disclosure may be all video frames in a predetermined time window (for example, n seconds, where n is a positive number); or may be a plurality of video frames selected from all video frames in a predetermined time window, for example, a plurality of video frames containing the face portion of the target object that are selected from all video frames in a predetermined time window.

The organ area of the target object in the present disclosure generally refers to an area where an organ in the face portion of the target object is located, for example, an eye area and a mouth area of the target object, wherein the eye area may refer to a single-eye area (such as a left-eye area or a right-eye area) or a two-eye area. In other words, the image-block sequence based on the organ area in the present disclosure may be an image-block sequence based on the eye area, or may be an image-block sequence based on the mouth area.

According to the present disclosure, the image block containing the organ area of the target object in each video frame may be obtained by performing image recognition and other processing on the plurality of video frames, so as to obtain the image-block sequence that is based on the organ area.

According to the present disclosure, at least one image-block sequence that is based on the organ area may be obtained from the plurality of video frames. In other words, according to the present disclosure, one image-block sequence or a plurality of image-block sequences may be obtained from the plurality of video frames. For example, according to the present disclosure, an image-block sequence based on the eye area may be obtained from the plurality of video frames. For another example, according to the present disclosure, an image-block sequence based on the mouth area may be obtained from the plurality of video frames. For another example, according to the present disclosure, an image-block sequence based on the eye area and an image-block sequence based on the mouth area may be obtained from the plurality of video frames.

In step S201, a fatigue state type of the target object is determined based on the image-block sequence.

Step S201 in the present disclosure is performed at the mobile device end. The fatigue state type in the present disclosure may refer to a type to which the fatigue state belongs. According to the present disclosure, all fatigue states may be classified into at least two types in advance, wherein one type is a first preset type. In an example, the first preset type may refer to a type in which the mobile device cannot accurately determine a fatigue level of the target object. For example, the first preset type may be referred to as a suspected fatigue state type, and may include a plurality of suspected fatigue levels.

According to the present disclosure, a fatigue detection result may be obtained by performing fatigue detection on the image-block sequence that is based on the organ area, and the fatigue detection result is determined by using a condition that is preset for each fatigue state type. In this way, the fatigue state type of the target object is determined.

In step S202, the image-block sequence is sent to a cloud server if the fatigue state type meets a first preset type, so that the cloud server detects a fatigue level of the target object based on the image-block sequence.

The cloud server in the present disclosure may refer to a server with features such as being highly distributed and highly virtualized. The fatigue level in the present disclosure may refer to a level classified according to the degree of fatigue. All fatigue levels do not belong to the first preset type, that is, the fatigue level belongs to a non-first preset type. In an example, the first preset type may include a plurality of suspected fatigue levels. The cloud server may perform fatigue detection on the image-block sequence by means of a fatigue detection requiring a powerful compute resource, and obtains the fatigue level of the target object based on the fatigue detection result.

In step S203, fatigue level information about the target object that is returned by the cloud server is received.

Step S203 in the present disclosure is performed at the mobile device end. The mobile device may perform a corresponding operation based on the fatigue level information about the target object that is returned by the cloud server. For example, information about a respective operation corresponding to each fatigue level is preset at the mobile device end, and when receiving the fatigue level information about the target object that is returned by the cloud serve, the mobile device end may determine an operation that currently needs to be performed based on the received fatigue level information and the preset information, and perform the operation.

According to the present disclosure, the image-block sequence is provided to the cloud server when the mobile device determines that the fatigue state type of the target object meets the first preset type, so that the cloud server may provide the fatigue level of the target object to the mobile device based on the image-block sequence. In this way, fatigue state detection with end-cloud combination is achieved. Because the compute resource of the cloud server is more powerful than that of the mobile device, the cloud server may perform more accurate fatigue state detection on the image-block sequence. This is helpful for improving accuracy of fatigue detection, thereby helping to improve driving safety of the mobile device. In addition, the information sent to the cloud server by the mobile device end is an image-block sequence that only includes the organ area of the target object rather than a video frame containing a face area of the target object. Therefore, data volume for transmitting an image to the cloud server by the mobile device end can be reduced while user privacy is protected.

In an optional example, a second preset type in the present disclosure may refer to a fatigue state type to which the fatigue level belongs. To be specific, the second preset type may include a plurality of fatigue levels. According to the present disclosure, when the fatigue state type of the target object that is determined by the mobile device end by using the image-block sequence based on the organ area meets the second preset type, an operation corresponding to the second preset type and for reminding the target object to pay attention to driving of the mobile device may be performed. In addition, according to the present disclosure, the corresponding operation for reminding the target object to pay attention to driving of the mobile device may be performed in according with the fatigue level returned by the cloud server. The operation herein may be set according to actual requirements, and may include an operation for alleviating/eliminating the fatigue state of the target object. In an example, the operation for reminding the target object to pay attention to the driving of the mobile device may include one or more of the following operations: opening a vehicle window at a position of the driver, turning on a cold-air system in the vehicle, turning on a music playback function, turning on a voice greeting function, and turning on a voice alert function.

Optionally, when the second preset type includes a plurality of fatigue levels, usually the operation corresponding to each fatigue levels and for reminding the target object to pay attention to the driving of the mobile device varies. A higher fatigue level indicates a larger intensity of the corresponding operation for reminding the target object to pay attention to the driving of the mobile device.

In an example, the operation in the present disclosure for reminding the target object to pay attention to the driving of the mobile device may include different parameters, and different parameters correspond to different fatigue levels. Moreover, different parameters may enable a same operation for reminding the target object to pay attention to the driving of the mobile device to have different intensities.

In a more specific example, the fatigue levels may include at least: severe fatigue, moderate fatigue, and mild fatigue. The three fatigue levels all correspond to the operation of opening the vehicle window at the position of the driver. Moreover, the severe fatigue corresponds to an operation of opening the vehicle window at the position of the driver with a first parameter; the moderate fatigue corresponds to an operation of opening the vehicle window at the position of the driver with a second parameter; and the mild fatigue corresponds to an operation of opening the vehicle window at the position of the driver with a third parameter. The first parameter, the second parameter, and the third parameter are parameters for degree at which the vehicle window is opened. When the operation of opening the vehicle window at the position of the driver with the first parameter is performed, the vehicle window at the position of the driver may be completely opened. When the operation of opening the vehicle window at the position of the driver with the second parameter is performed, one third of the vehicle window at the position of the driver may be opened. When the operation of opening the vehicle window at the position of the driver with the third parameter is performed, one fifth of the vehicle window at the position of the driver may be opened.

In another more specific example, the fatigue levels may include at least: severe fatigue, moderate fatigue, and mild fatigue. The three fatigue levels all correspond to an operation of turning on the music playback function. Moreover, the severe fatigue corresponds to an operation of turning on the music playback function with a first parameter; the moderate fatigue corresponds to an operation of turning on the music playback function with a second parameter; and the mild fatigue corresponds to an operation of turning on the music playback function with a third parameter. The first parameter, the second parameter, and the third parameter are parameters for intensity of music rhythm. When the operation of turning on the music playback function with the first parameter is performed, music with a strong rhythm may be played. When the operation of turning on the music playback function with the second parameter is performed, music with a relatively strong rhythm may be played. When the operation of turning on the music playback function with the third parameter is performed, music with a relatively relaxed rhythm may be played.

According to the present disclosure, performing the operation corresponding to the second preset type and for reminding the target object to pay attention to the driving of the mobile device when it is determined that the fatigue state type of the target object meets the second preset type helps to alleviate or eliminate the fatigue state of the target object, thereby helping to improve the driving safety of the mobile device.

In an optional example, according to the present disclosure, organ key points may be used to obtain an image block containing a corresponding organ area of the target object from the video frame. A more specific example is shown in FIG. 3.

In FIG. 3, in step S300, key points are respectively extracted for the plurality of video frames collected by the camera apparatus disposed in the mobile device, to obtain face key points of the target object.

Optionally, according to the present disclosure, the face key points of the target object in each video frame may be obtained by using a neural network for key point recognition. For example, the video frames are sequentially provided to the neural network for key point recognition as input information, and the neural network performs face key point extraction and obtains the face key points of the target object in each video frame based on output information of the neural network. The face key point herein may include a label of the face key point, a coordinate position of the face key point in the video frame, and the like. The neural network for key point recognition in the present disclosure may be a convolutional neural network including at least a convolutional layer, a pooling layer, and a fully-connected layer.

In step S301, for any video frame in the plurality of video frames, an organ area of the target object is determined based on corresponding organ key points in the face key points of the target object in the video frame, and obtain an image block containing the corresponding organ area of the target object from the video frame.

Optionally, according to the present disclosure, whether the face key point is the corresponding organ key point (for example, a left-eye key point, a right-eye key point, or a mouth key point) may be determined based on the label of the face key point, and the organ area of the target object in the video frame is obtained based on the coordinate position of the determined organ key point. For example, for a video frame, a maximum horizontal coordinate, a maximum vertical coordinate, a minimum horizontal coordinate, and a minimum vertical coordinate of the organ key points in the video frame are first obtained, and an area defined by the four coordinates is enlarged according to a proportion, so that the enlarged area may be taken as the organ area of the target object in the video frame. For a video frame, according to the present disclosure, the video frame may be clipped based on the organ area of the target object in the video frame, so as to obtain the image block containing the corresponding organ area of the target object in the video frame.

The face key points may accurately describe a specific location of a corresponding organ in the face portion. Therefore, in the present disclosure, the image block containing the corresponding organ area of the target object may be accurately obtained by detecting the face key points of the target object in each video frame.

In an optional example, according to the present disclosure, when the image-block sequence based on the organ area is sent to the cloud server, the organ key points or the face key points may be sent to the cloud server together with the image-block sequence. For example, when it is determined that the fatigue state type meets the first preset type, according to the present disclosure, the image-block sequence based on the organ area and the organ key points of the target object in the plurality of video frames may be sent to the cloud server. For another example, when it is determined that the fatigue state type meets the first preset type, according to the present disclosure, the image-block sequence based on the organ area and the face key points of the target object in the plurality of video frames may be sent to the cloud server.

The mobile device end in the present disclosure determines the fatigue state type based on the image-block sequence that is based on the organ area. Therefore, accuracy of the image block based on the organ area that is obtained by the mobile device end from the video frame may affect accuracy of determining the fatigue state type by the mobile device end. The image block based on the organ area is obtained by using the organ key points in the face key points. Therefore, according to the present disclosure, the face key points or the organ key points of the target object in each video frame are uploaded to the cloud server, so that the cloud server may detect whether the organ key points extracted by the mobile device end are accurate based on the received image-block sequence that is based on the organ area. If the cloud server considers that accuracy of the organ key point extracted by the mobile device end needs to be improved, the cloud server may determine update information of parameters used by the mobile device to extract the face key points, and send the update information to the mobile device, so that the mobile device updates, based on the update information, the parameters used by the mobile device to extract the face key points. In this way, accuracy of fatigue detection of the mobile device end is facilitated to be improved.

In an optional example, the second preset type in the present disclosure may include a plurality of fatigue levels, and each fatigue level has a respective threshold. The threshold corresponding to each fatigue level may be referred to as a first threshold of each fatigue level. The first threshold of the fatigue level is used to determine the fatigue level of the target object. The first preset type in the present disclosure may include a plurality of suspected fatigue levels, and each suspected fatigue level has a respective threshold. The threshold corresponding to each suspected fatigue level may be referred to as a second threshold of each suspected fatigue level. The second threshold of the suspected fatigue level is used to determine the suspected fatigue level of the target object. The suspected fatigue level may mean that although a condition for a fatigue level is not satisfied, the condition for the fatigue level is very close to. According to the present disclosure, whether a condition for a fatigue level is very close to may be measured by using a preset threshold.

Optionally, a quantity of the fatigue levels is usually the same as that of the suspected fatigue levels. For example, the second preset type may include: severe fatigue, moderate fatigue, mild fatigue, and non-fatigue; and the first preset type may include: suspected severe fatigue, suspected moderate fatigue, suspected mild fatigue, and suspected non-fatigue. The suspected severe fatigue may mean that although a condition for severe fatigue is not met (for example, confidence does not reach the first threshold of severe fatigue), the condition for severe fatigue is very close to (for example, the confidence reaches the second threshold of suspected severe fatigue, where the second threshold of suspected severe fatigue may be slightly smaller than the first threshold of severe fatigue). The suspected moderate fatigue may mean that although a condition for moderate fatigue is not met (for example, confidence does not reach the first threshold of moderate fatigue), the condition for moderate fatigue is very close to (for example, the confidence reaches the second threshold of suspected moderate fatigue, where the second threshold of suspected moderate fatigue is slightly smaller than the first threshold of moderate fatigue). The suspected mild fatigue may mean that although a condition for mild fatigue is not met (for example, confidence does not reach the first threshold of mild fatigue), the condition for mild fatigue is very close to (for example, the confidence reaches the second threshold of suspected mild fatigue, where the second threshold of suspected mild fatigue usually is slightly smaller than the first threshold of mild fatigue). Certainly, the quantity of the fatigue levels may be larger than that of the suspected fatigue levels.

Optionally, an example of determining the fatigue state type of the target object in the present disclosure may be as shown in FIG. 4.

In FIG. 4, in step S400, confidence for which the target object is respectively at each fatigue level contained in the second preset type is obtained based on the image-block sequence that is based on the organ area.

Optionally, supposing that the second preset type includes n (n is an integer larger than 0) fatigue levels, according to the present disclosure, confidence for which the target object is respectively at n fatigue levels and one non-fatigue level (that is, a normal state) may be determined by using a neural network for fatigue level classification, so as to obtain (n+1) confidence, wherein n confidence respectively correspond to a fatigue level, and the remaining one confidence corresponds to the normal state.

In an example, according to the present disclosure, the image-block sequence based on the organ area may be provided to the neural network for fatigue level classification as input. The neural network performs fatigue level classification on the input information, and confidence for which the target object is at n fatigue levels and confidence for which the target object is in a normal state may be obtained based on information output by the neural network. The neural network for fatigue level classification may be a convolutional neural network including at least a convolutional layer, a pooling layer, and a fully-connected layer.

In step S401, the fatigue state type of the target object is determined based on a first threshold of each fatigue level, a second threshold of each suspected fatigue level, and the confidence.

Optionally, for any fatigue level and the corresponding suspected fatigue level (for example, severe fatigue and suspected severe fatigue; for another example, moderate fatigue and suspected moderate fatigue; for another example, mild fatigue and suspected mild fatigue; and for another example, non-fatigue and suspected non-fatigue) of the fatigue level, according to the present disclosure, whether a magnitude relationship between the confidence of the fatigue level and the first threshold of the fatigue level and the second threshold of the suspected fatigue level satisfies a condition set for the fatigue level and a condition set for the suspected fatigue level may be determined. For example, the condition set for the fatigue level is whether the confidence of the fatigue level reaches the first threshold of the fatigue level, and the condition set for the suspected fatigue level is whether the confidence of the fatigue level reaches the second threshold of the suspected fatigue level. If a determination result is that the condition set for the fatigue level is satisfied (for example, the confidence of the fatigue level reaches the first threshold of the fatigue level), it may be determined that the target object is at the fatigue level. In other words, the fatigue state type of the target object is the second preset type. If a determination result is that the condition set for the fatigue level is not satisfied but the condition set for the suspected fatigue level is satisfied (for example, the confidence of the fatigue level does not reach the first threshold of the fatigue level but reaches the second threshold of the suspected fatigue level), it may be determined that the target object is at the suspected fatigue level. In other words, the fatigue state type of the target object is the first preset type. If a determination result is that neither the condition set for the fatigue level nor the condition set for the suspected fatigue level is satisfied, it may be determined that the target object is neither at the fatigue level nor at the suspected fatigue level. In other words, the fatigue state type of the target object is neither the first preset type nor the second preset type.

According to the present disclosure, a first threshold is respectively set for each fatigue level and a second threshold is respectively set for each suspected fatigue level. When it is determined that the target object is in the first preset type by using the second threshold of the suspected fatigue level and the confidence, the fatigue level of the target object may be determined by the cloud server. Therefore, when setting the first threshold, there may be no need to over-consider an omission caused by that the first threshold is set too high, thereby simplifying the setting of the first threshold.

In an optional example, according to the present disclosure, when sending the image-block sequence based on the organ area to the cloud server, the confidence, determined by the mobile device end, for which the target object is respectively at each fatigue level contained in the second preset type may be sent to the cloud server together with the image-block sequence. In other words, when it is determined that the fatigue state type meets the first preset type, according to the present disclosure, the image-block sequence based on the organ area and the confidence that is obtained by the mobile device end based on the plurality of video frames and for which the target object is respectively at each fatigue level contained in the second preset type may be sent to the cloud server. In an example, when it is determined that the fatigue state type meets the first preset type, according to the present disclosure, the image-block sequence based on the organ area, the organ key points, and the confidence that is obtained by the mobile device end based on the plurality of video frames and for which the target object is respectively at each fatigue level contained in the second preset type may be sent to the cloud server. In another example, when it is determined that the fatigue state type meets the first preset type, according to the present disclosure, the image-block sequence based on the organ area, the face key points, and the confidence that is obtained by the mobile device end based on the plurality of video frames and for which the target object is respectively at each fatigue level contained in the second preset type may be sent to the cloud server.

The mobile device end in the present disclosure determines the fatigue state type based on the confidence for which the target object is respectively at each fatigue level contained in the second preset type. Therefore, accuracy of obtaining the confidence of each fatigue level by the mobile device end from the image block based on the organ area may affect the accuracy of determining the fatigue state type by the mobile device end. According to the present disclosure, the confidence of each fatigue level is uploaded to the cloud server together with the image-block sequence, so that the cloud server may detect whether the confidence of each fatigue level that is obtained by the mobile device end is accurate based on the received image-block sequence that is based on the organ area. If the cloud server considers that accuracy of the confidence of each fatigue level that is obtained by the mobile device end needs to be improved, the cloud server may determine update information of parameters used by the mobile device to obtain the confidence of each fatigue level, and send the update information to the mobile device, so that the mobile device updates, based on the update information, the parameters used by the mobile device to obtain the confidence of each fatigue level. In this way, the accuracy of the fatigue detection performed by the mobile device end is facilitated to be improved.

In an optional example, the first threshold of each fatigue level in the present disclosure may be a first universal threshold of each fatigue level for a plurality of target objects, or the first threshold of each fatigue level in the present disclosure may alternatively be a first dedicated threshold of each fatigue level for a predetermined target object. In addition, the second threshold of each suspected fatigue level in the present disclosure may be a second universal threshold of each suspected fatigue level for a plurality of target objects, or the second threshold of each suspected fatigue level in the present disclosure may alternatively be a second dedicated threshold of each suspected fatigue level for the predetermined target object. It should be noted that when the first threshold of each fatigue level is the first universal threshold of each fatigue level for a plurality of target objects, the second threshold of each suspected fatigue level is usually the second universal threshold of each suspected fatigue level for a plurality of target objects. Moreover, when the first threshold of each fatigue level is the first dedicated threshold of each fatigue level for the predetermined target object, the second threshold of each suspected fatigue level is usually the second dedicated threshold of each suspected fatigue level for the predetermined target object.

Optionally, according to the present disclosure, an example of determining the fatigue state type of the target object by using the first dedicated threshold and the second dedicated threshold is as shown in FIG. 5.

In FIG. 5, in step S500, face recognition is respectively performed on the plurality of video frames, to obtain a face identifier of the target object in the plurality of video frames.

Optionally, according to the present disclosure, the plurality of video frames may be respectively performed with face recognition by using a neural network for face recognition, so as to obtain the face identifier of the target object in each video frames based on information output by the neural network. The neural network for face recognition in the present disclosure may be a convolutional neural network including at least a convolutional layer, a pooling layer, and a fully-connected layer.

In step S501, a first dedicated threshold of each fatigue level and a second dedicated threshold of each suspected fatigue level that correspond to the face identifier are obtained.

Optionally, personalization information based on the face identifier is pre-stored in the present disclosure. For example, the first dedicated threshold of each fatigue level and the second dedicated threshold of each suspected fatigue level that respectively correspond to at least one face identifier are pre-stored in the present disclosure. According to the present disclosure, searching may be performed in the pre-stored personalization information by using the face identifier obtained in S500. If the face identifier obtained in S500 exists in the pre-stored personalization information, the first dedicated threshold of each fatigue level and the second dedicated threshold of each suspected fatigue level that correspond to the face identifier are obtained from the pre-stored personalization information. If the face identifier obtained in S500 does not exist in the pre-stored personalization information, the first universal threshold of each fatigue level and the second universal threshold of each suspected fatigue level may be obtained.

Optionally, the pre-stored personalization information based on the face identifier in the present disclosure may further include a dedicated network parameter of the neural network for fatigue level classification. According to the present disclosure, confidence for which the predetermined target object is respectively at each fatigue level contained in the second preset type may be determined by using the neural network for fatigue level classification that is based on the dedicated network parameter. For example, according to the present disclosure, the neural network for fatigue level classification may be initialized by using the dedicated network parameter corresponding to the face identifier, and the image-block sequence based on the organ area may be provided to the neural network for fatigue level classification as input. In this way, the confidence for which the target object corresponding to the face identifier is respectively at each fatigue level is obtained based on the information output by the neural network.

In step S502, the fatigue state type of the target object is determined in accordance with the first dedicated threshold, the second dedicated threshold, and the confidence for which the target object is respectively at each fatigue level contained in the second preset type.

Optionally, for any fatigue level and the corresponding suspected fatigue level (for example, severe fatigue and suspected severe fatigue; for another example, moderate fatigue and suspected moderate fatigue; for another example, mild fatigue and suspected mild fatigue; and for another example, non-fatigue and suspected non-fatigue) of the fatigue level, according to the present disclosure, it may be determined that whether a magnitude relationship between the confidence of the fatigue level and the first dedicated threshold of the fatigue level and the second dedicated threshold of the suspected fatigue level satisfies a condition set for the fatigue level and a condition set for the suspected fatigue level. For example, it is determined that whether the confidence of the fatigue level reaches the first dedicated threshold of the fatigue level, and whether the confidence of the fatigue level reaches the second dedicated threshold of the suspected fatigue level. If a determination result is that the condition set for the fatigue level is satisfied (for example, the confidence of the fatigue level reaches the first dedicated threshold of the fatigue level), it may be determined that the target object is at the fatigue level. In other words, the fatigue state type of the target object is the second preset type. If a determination result is that the condition set for the fatigue level is not satisfied but the condition set for the suspected fatigue level is satisfied (for example, the confidence of the fatigue level does not reach the first dedicated threshold of the fatigue level but reaches the second dedicated threshold of the suspected fatigue level), it may be determined that the target object is at the suspected fatigue level. In other words, the fatigue state type of the target object is the first preset type. If a determination result is that neither the condition set for the fatigue level nor the condition set for the suspected fatigue level is satisfied, it may be determined that the target object is neither at the fatigue level nor at the suspected fatigue level. In other words, the fatigue state type of the target object is neither the first preset type nor the second preset type.

In some application scenarios, no matter the mobile device is a private mobile device or a public transit-based mobile device, the driver of the mobile device is generally relatively fixed. According to the present disclosure, for the predetermined target object, a first dedicated threshold is respectively set for each fatigue level and a second dedicated threshold is respectively set for each suspected fatigue level. In this way, on the basis of simplifying setting of the first dedicated threshold, fatigue detection may be performed regarding personalized features of the predetermined target object, thereby helping to improve accuracy of fatigue detection for the predetermined target object.

In an optional example, according to the present disclosure, when the image-block sequence based on the organ area is sent to the cloud server, the personalization information of the target object corresponding to the face identifier recognized by the mobile device end may be sent to the cloud server together with the image-block sequence. To be specific, when it is determined that the fatigue state type meets the first preset type, according to the present disclosure, the image-block sequence based on the organ area, a network parameter that is of the neural network for fatigue level classification and corresponds to the face identifier recognized by the mobile device end, the first dedicated threshold of each fatigue level and the second dedicated threshold of each suspected fatigue level that correspond to the face identifier recognized by the mobile device end, and the confidence that is obtained by the mobile device end based on the plurality of video frames and for which the target object is respectively at each fatigue level contained in the second preset type may be sent to the cloud server. In an example, when it is determined that the fatigue state type meets the first preset type, according to the present disclosure, the image-block sequence based on the organ area, the organ key points, the network parameter that is of the neural network for fatigue level classification and corresponds to the face identifier recognized by the mobile device end, the first dedicated threshold of each fatigue level and the second dedicated threshold of each suspected fatigue level that correspond to the face identifier recognized by the mobile device end, and the confidence that is obtained by the mobile device end based on the plurality of video frames and for which the target object is respectively at each fatigue level contained in the second preset type may be sent to the cloud server. In another example, when it is determined that the fatigue state type meets the first preset type, according to the present disclosure, the image-block sequence based on the organ area, the face key points, the network parameter that is of the neural network for fatigue level classification and corresponds to the face identifier recognized by the mobile device end, the first dedicated threshold of each fatigue level and the second dedicated threshold of each suspected fatigue level that correspond to the face identifier recognized by the mobile device end, and the confidence that is obtained by the mobile device end based on the plurality of video frames and for which the target object is respectively at each fatigue level contained in the second preset type may be sent to the cloud server.

The mobile device end in the present disclosure determines the fatigue state type based on the personalization information corresponding to the face identifier. Therefore, accuracy of the personalization information used by the mobile device end may not only affect the accuracy of the confidence of each fatigue level obtained in the present disclosure but also affect the accuracy of determining the fatigue state type by the mobile device end. According to the present disclosure, the personalization information corresponding to the face identifier is uploaded to the cloud server together with the image-block sequence, so that the cloud server may detect whether the personalization information used by the mobile device end is accurate based on the received image-block sequence that is based on the organ area. If the cloud server considers that accuracy of the personalization information used by the mobile device end needs to be improved, the cloud server may determine update information of the personalization information used by the mobile device, and send the update information to the mobile device, so that the mobile device updates the personalization information corresponding to the face identifier based on the update information. In this way, accuracy of the fatigue detection for the predetermined target object by the mobile device end is facilitated to be improved. For example, the cloud server may initialize the network parameter of the neural network for fatigue level classification by using the received dedicated network parameter of the neural network for fatigue level classification, and process the image-block sequence by using the initialized neural network for fatigue level classification, to obtain the confidence for which the target object is at each fatigue level. In this way, the cloud server may determine the fatigue level of the target object based on the confidence, so that the cloud server may determine whether the first dedicated threshold and the second dedicated threshold used by the mobile device end need to be updated.

In an optional example, according to the present disclosure, in a case of receiving parameter update information of the mobile device that is returned by the cloud server based on the image-block sequence uploaded by the mobile device, a parameter used by the mobile device may be updated based on the parameter update information of the mobile device. For example, when it is detected that the mobile device is stopped, the parameter used by the mobile device is updated based on the received parameter update information of the mobile device. The parameter used by the mobile device may include at least one of the following: a network parameter of at least one neural network in the mobile device (for example, the neural network for key point recognition; and for another example, the neural network for fatigue level classification), the first threshold of each fatigue level (for example, the first dedicated threshold or the first universal threshold of each fatigue level), and the second threshold of each suspected fatigue level (for example, the second dedicated threshold or the second universal threshold of each suspected fatigue level). In other words, according to the present disclosure, at least one of the follows, the network parameter of at least one neural network, the first threshold of each fatigue level, and the second threshold of each suspected fatigue level in the mobile device, may be updated based on the received parameter update information of the mobile device.

According to the present disclosure, updating the network parameter of the neural network in the mobile device by using the parameter update information helps to improve performance of the neural network in the mobile device. For example, this is helpful for improving accuracy of key point recognition of the neural network for key point recognition. For another example, this is helpful for improving accuracy of fatigue level classification of the neural network for fatigue level classification. According to the present disclosure, updating the first threshold of each fatigue level and the second threshold of each suspected fatigue level in the mobile device by using the parameter update information helps to improve the accuracy of fatigue detection of the mobile device end.

In an optional example, when the cloud server in the present disclosure needs to return update information used for updating the network parameter of the neural network to the mobile device, a training sample with certain characteristics may be selected to train the neural network, thus obtaining the update information. When selecting the training sample, more consideration needs to be given to characteristics of the image-block sequence that is incorrectly determined by the mobile device end. An example of returning the network parameter of the neural network to the mobile device by the cloud server in the present disclosure is as shown in FIG. 6.

In FIG. 6, in step S600, the cloud server respectively determines the fatigue level of at least one target object based on a plurality of image-block sequences from at least one mobile device, to obtain a plurality of fatigue levels.

Optionally, the cloud server in the present disclosure may receive the image-block sequence and other information respectively sent by a plurality of mobile devices. The other information herein may include information about the face key points/information about the organ key points that are extracted by the mobile device end, the network parameter of the neural network for fatigue level classification, the network parameter for key point classification, the first threshold of each fatigue level, the second threshold of each suspected fatigue level, and the confidence that is obtained by the mobile device end based on the plurality of video frames and for which the target object is respectively at each fatigue level contained in the second preset type.

Optionally, for an image-block sequence received by the cloud server, the cloud server may perform a fatigue detection thereto by simultaneously using a plurality of different neural networks (in other words, at least the image-block sequence is taken as input to be provided to a plurality of different neural networks), and determine a fatigue detection result of each neural network based on information output by each neural network. For example, the fatigue level that is of the target object and is determined by each neural network is determined based on the confidence, output by each neural network, for which the target object is at each fatigue level. According to the present disclosure, a preset voting mechanism may be used to vote on the fatigue detection result of each neural network, and the fatigue level of the target object may be determined based on a voting result.

In step S601, a plurality of training samples is selected based on characteristics of the plurality of image-block sequences when a difference between the plurality of fatigue levels determined by the cloud server and the fatigue state type determined by the mobile device satisfies a first predetermined condition.

Optionally, according to the present disclosure, when the cloud server determines that the target object is at a fatigue level based on an image-block sequence, however the mobile device end determines that the target object is at a suspected fatigue level based on the image-block sequence, the number of times for occurring of this difference may be counted, and the image-block sequence may be added into an image-block sequence set. The image-block sequence set may be referred to as a bad case set. According to the present disclosure, it may be determined that the difference satisfies the first predetermined condition when an accumulated count value reaches a predetermined count value, so as to start a process of selecting the training samples and train the neural network.

Optionally, according to the present disclosure, when the confidence that is determined by the cloud server and for which the target object is at each fatigue level is different from the confidence that is determined by the mobile device and for which the target object is at each fatigue level, confidence differences may be accumulated. Moreover, it is determined that the difference satisfies a first predetermined condition when an accumulated confidence difference value reaches a predetermined confidence value, so as to start the process of selecting the training samples and train the neural network.

Optionally, the plurality of image-block sequences in this step may refer to a plurality of image-block sequences in the foregoing obtained image-block sequence set. The characteristics of the image-block sequence in the present disclosure may refer to characteristics of an organ of the target object in the image-block sequence. For example, the characteristics of the image-block sequence may include: degree of eye closing, and degree of mouth opening and closing, and the like. In an example, a plurality of training samples selected in the present disclosure are all image samples with annotation information, and the annotation information may be annotation information based on the fatigue level.

In step S602, at least one neural network in the mobile device is trained by using the plurality of selected training samples.

Optionally, according to the present disclosure, the selected training samples may be respectively provided to a to-be-trained neural network (such as the neural network for fatigue level classification) as input. Moreover, loss is calculated by using a loss function based on information output by the to-be-trained neural network and the annotation information of the corresponding training sample, and the calculated loss is back propagated in the to-be-trained neural network, to adjust a network parameter of the to-be-trained neural network.

Optionally, when training for the to-be-trained neural network reaches a predetermined iterative condition, this training process ends. The predetermined iterative condition in the present disclosure may include that a difference between the information output by the neural network and the annotation information of the corresponding training sample satisfies predetermined requirements on differences. When the difference satisfies the requirements, the neural network is successfully trained. The predetermined iterative conditions in the present disclosure may also include that a quantity of training samples used for training the to-be-trained neural network reaches predetermined requirements on quantity. When the quantity of used training samples reaches the predetermined requirements on quantity but the difference between the information output by the neural network and the annotation information of the corresponding training sample does not satisfy the predetermined requirements on differences, the neural network is not successfully trained.

It should be noted that according to the present disclosure, the neural network used by the cloud server may also be trained by using the selected training samples, so as to update the network parameter of the neural network used by the cloud server. According to the present disclosure, an image sequence in an abnormal sample set (such as the bad case set) may also be used to update thresholds used by the cloud server. For example, the image sequences are extracted from the bad case set through a screening platform, and the fatigue level determined for the extracted image sequence by the cloud server is obtained. The screening platform may determine whether the thresholds used by the cloud server to determine the fatigue level are accurate. If accuracy of determining the thresholds needs to be improved, the thresholds used by the cloud server may be adjusted.

In step S603, based on a network parameter of a neural network that is successfully trained, the network parameter of the neural network is returned to the mobile device.

Optionally, if the cloud server in the present disclosure further needs to update both the first threshold of each fatigue level and the second threshold of each suspected fatigue level in the mobile device, the network parameter of the neural network, the first threshold of each fatigue level, and the second threshold of each suspected fatigue level may be sent to a plurality of mobile devices at the same time.

A misjudgment is likely to occur when the neural network in the mobile device performs fatigue detection on an image-block sequence with certain characteristics. Therefore, the cloud server in the present disclosure selects a plurality of training samples based on characteristics of a plurality of image-block sequences, and trains the neural network in the mobile device by using the selected training samples. In this way, performance of the neural network may be improved in a targeted manner, thereby helping to improve accuracy of fatigue detection.

In an optional example, according to the present disclosure, when differences between the plurality of fatigue levels determined by the cloud server based on the image-block sequences received by the cloud server and the corresponding fatigue state type determined by the mobile device satisfies a second predetermined condition, parameters used by the mobile device to determine the fatigue state type of the target object may be obtained based on parameters used by the cloud server to determine the fatigue level of the target object, and the parameters are returned to each mobile device. To be specific, the parameters used by the cloud server to determine the fatigue level of the target object may be considered as a parameter set, and the parameters used by the mobile device to determine the fatigue state type of the target object may be considered as a subset of the parameter set. According to the present disclosure, a corresponding subset may be obtained from the parameter set, and may be returned to each mobile device. The subset may include at least one of the following: the first threshold of each fatigue level, the second threshold of each suspected fatigue level, and the network parameter of the neural network in the mobile device. In an example, the second predetermined condition in the present disclosure may be the same as the first predetermined condition. In another example, the second predetermined condition in the present disclosure may be different from the first predetermined condition.

According to the present disclosure, returning a subset of parameters in the parameters used by the cloud server as the parameters used by the mobile device to the mobile device is helpful for optimizing the parameters used by the mobile device, thereby helping to improve the performance of fatigue detection of the mobile device.

Exemplary Apparatus

Figure 7:
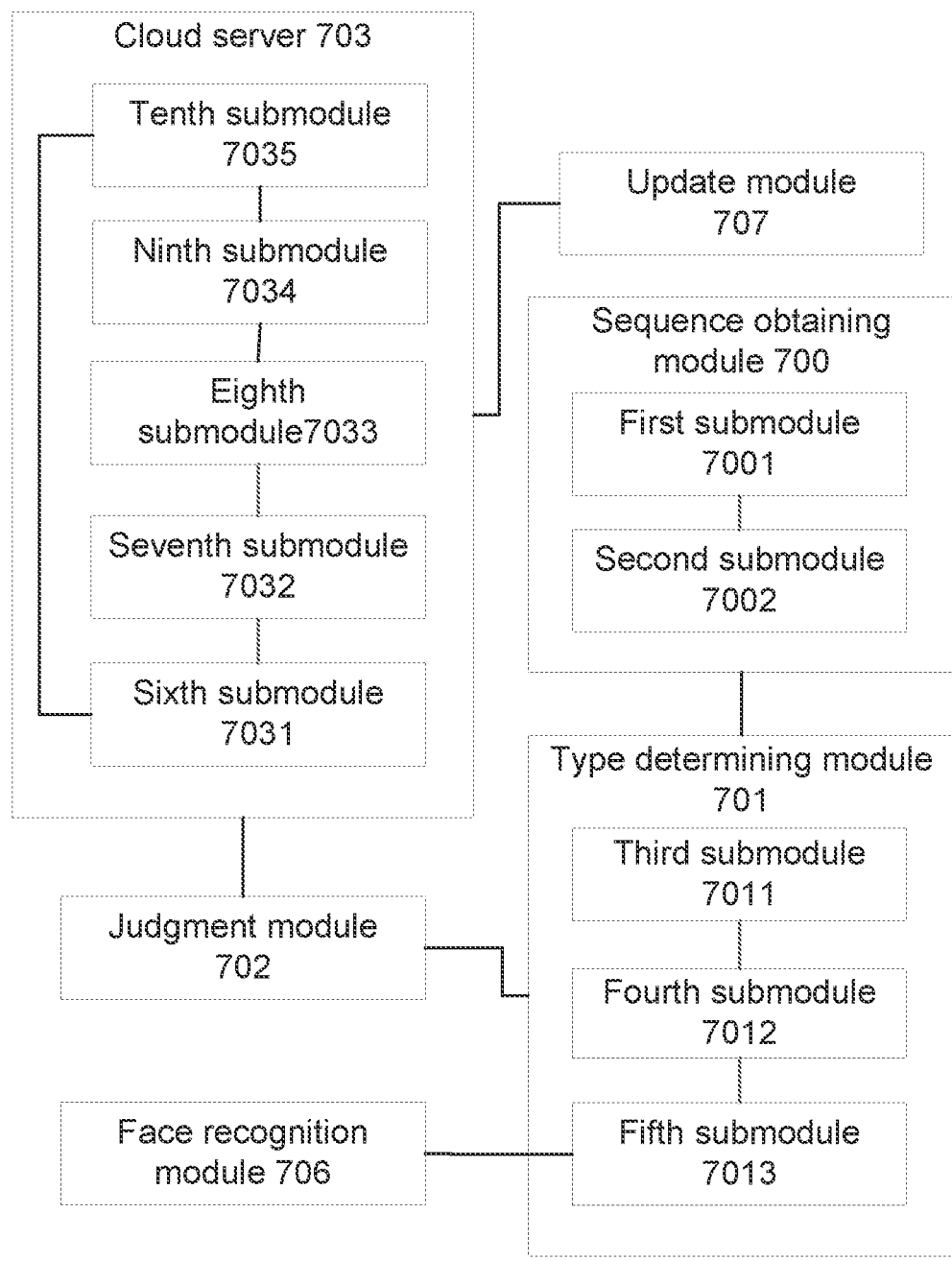
FIG. 7 is a schematic structural diagram of a fatigue state detection apparatus according to an embodiment of the present disclosure.

FIG. 7 is a schematic structural diagram of a fatigue state detection apparatus according to an embodiment of the present disclosure. The apparatus in this embodiment may be used to implement the corresponding method embodiments of the present disclosure. The apparatus shown in FIG. 7 includes a sequence obtaining module 700, a type determining module 701, a judgment module 702, and a receive module 704. Optionally, the apparatus may further include an execution module 705, a face recognition module 706, and an update module 707.

The sequence obtaining module 700 is configured to obtain image blocks containing an organ area of a target object from a plurality of video frames collected by a camera apparatus disposed in a mobile device, to obtain an image-block sequence that is based on the organ area.

The type determining module 701 is configured to determine a fatigue state type of the target object based on the image-block sequence obtained by the sequence obtaining module 700.

The judgment module 702 is configured to send the image-block sequence obtained by the sequence obtaining module 700 to a cloud server if the fatigue state type determined by the type determining module 701 meets a first preset type, so that the cloud server 703 detects a fatigue level of the target object based on the image-block sequence.

The receive module 704 is configured to receive fatigue level information about the target object that is returned by the cloud server 703.

The execution module 705 is configured to perform, when the fatigue state type determined by the type determining module 701 meets a second preset type, an operation corresponding to the second preset type and for reminding the target object to pay attention to driving of the mobile device.

Optionally, the sequence obtaining module 700 includes a first submodule 7001 and a second submodule 7002. The first submodule 7001 is configured to respectively extract key points for the plurality of video frames collected by the camera apparatus disposed in the mobile device, to obtain face key points of the target object. The second submodule 7002 is configured to determine, for any video frame in the plurality of video frames, the organ area of the target object based on corresponding organ key points in the face key points of the target object in the video frame, and obtain the image block containing the corresponding organ area of the target object from the video frame.

In an example, the judgment module 702 may be further configured to send the image-block sequence and the organ key points of the target object in the plurality of video frames to the cloud server if the fatigue state type meets the first preset type. In another example, the judgment module 702 may be further configured to send the image-block sequence and the face key points of the target object in the plurality of video frames to the cloud server 703 if the fatigue state type meets the first preset type. The organ key points or the face key points are used for the cloud server 703 to obtain update information of parameters used by the mobile device to extract the face key points.

Optionally, the type determining module 701 may include a third submodule 7011 and a fourth submodule 7012. The third submodule 7011 is configured to obtain confidence for which the target object is respectively at each fatigue level contained in the second preset type based on the image-block sequence. The fourth submodule 7012 is configured to determine the fatigue state type of the target object based on a first threshold of each fatigue level, a second threshold of each suspected fatigue level, and the confidence obtained by the third submodule 7011. The first threshold of the fatigue level is used for determining the fatigue level of the target object, and the second threshold of the suspected fatigue level is used for determining the suspected fatigue level of the target object.

In an example, the judgment module 702 may be further configured to send the image-block sequence and the confidence for which the target object is respectively at each fatigue level contained in the second preset type to the cloud server if the fatigue state type meets the first preset type.

Optionally, the first threshold of the fatigue level in the present disclosure includes a first universal threshold of each fatigue level for a plurality of target objects, or a first dedicated threshold of each fatigue level for a predetermined target object. The second threshold of the suspected fatigue level in the present disclosure includes a second universal threshold of each suspected fatigue level for a plurality of target objects, or a second dedicated threshold of each suspected fatigue level for a predetermined target object.

The face recognition module 706 is configured to respectively perform face recognition on the plurality of video frames, to obtain a face identifier of the target object in the plurality of video frames.

The type determining module 701 may further include a fifth submodule 7013. The fifth submodule 7013 is configured to obtain the first dedicated threshold of each fatigue level and the second dedicated threshold of each suspected fatigue level that correspond to the face identifier recognized by the face recognition module 706. The fourth submodule 7012 may be configured to determine the fatigue state type of the target object based on the first dedicated threshold, the second dedicated threshold, and the confidence.

Optionally, the judgment module 702 may be further configured to send personalization information of the target object corresponding to the face identifier to the cloud server 703. The personalization information of the target object corresponding to the face identifier is used for the cloud server 703 to obtain update information of the first dedicated threshold and/or the second dedicated threshold.

Optionally, the update module 707 is configured to receive parameter update information of the mobile device that is returned by the cloud server 703 based on the image-block sequence, and update a parameter used by the mobile device based on the parameter update information of the mobile device.

Optionally, the update module 707 may be further configured to update at least one of a network parameter of at least one neural network, the first threshold of each fatigue level, and the second threshold of each suspected fatigue level in the mobile device based on the received parameter update information of the mobile device.

Optionally, the cloud server 703 includes a sixth submodule 7031, a seventh submodule 7032, an eighth submodule 7033, and a ninth submodule 7034. The sixth submodule 7031 is configured to respectively determine the fatigue level of at least one target object based on a plurality of image-block sequences from at least one mobile device, to obtain a plurality of fatigue levels. The seventh submodule 7032 is configured to select a training sample based on characteristics of the plurality of image-block sequences when a difference between the plurality of fatigue levels determined by the sixth submodule 7031 and the fatigue state type determined by the mobile device satisfies a first predetermined condition. The eighth submodule 7033 is configured to train at least one neural network in the mobile device by using the training sample selected by the seventh submodule 7032. The ninth submodule 7034 is configured to return the network parameter to the mobile device based on the network parameter of the neural network that is successfully trained by the eighth submodule 7033.

Optionally, the cloud server 703 includes the sixth submodule 7031, the ninth submodule 7034, and a tenth submodule 7035. The sixth submodule 7031 is configured to respectively determine the fatigue level of at least one target object based on a plurality of image-block sequences from at least one mobile device, to obtain a plurality of fatigue levels. The tenth submodule 7035 may be configured to obtain parameters used by the mobile device to determine the fatigue state type of the target object based on parameters used by the cloud server to determine the fatigue level of the target object when a difference between the plurality of fatigue levels determined by the sixth submodule 7031 and the fatigue state type determined by the mobile device satisfies a second predetermined condition. The ninth submodule 7034 is configured to return the parameter obtained by the tenth submodule 7035 to the mobile device.

Exemplary Electronic Device

Figure 8:
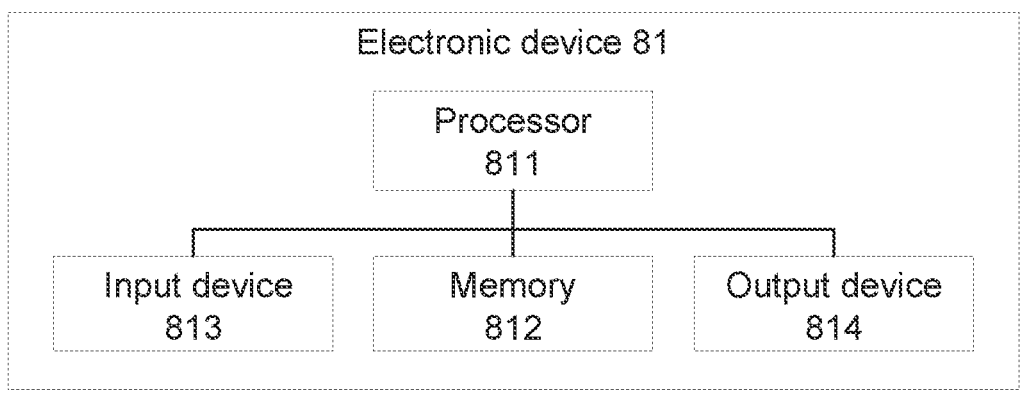
FIG. 8 is a structural diagram of an electronic device according to an exemplary embodiment of the present disclosure.

An electronic device according to an embodiment of the present disclosure is described below with reference to FIG. 8. FIG. 8 shows a block diagram of an electronic device according to an embodiment of the present disclosure. As shown in FIG. 8, an electronic device 81 includes one or more processors 811 and a memory 812.

The processor 811 may be a central processing unit (CPU) or another form of processing unit having a data processing capability and/or an instruction execution capability, and may control another component in the electronic device 81 to perform a desired function.

The memory 812 may include one or more computer program products. The computer program product may include various forms of computer-readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer-readable storage medium. The program instruction may be executed by the processor 811, to implement the fatigue state detection method according to the foregoing various embodiments of the present disclosure and/or other desired functions. Various contents such as an input signal, a signal component, and a noise component may also be stored in the computer-readable storage medium.

In an example, the electronic device 81 may further include an input device 813 and an output device 814. These components are connected with each other through a bus system and/or another form of connection mechanism (not shown). In addition, the input device 813 may further include, for example, a keyboard and a mouse. The output device 814 may output various information to the outside. The output device 814 may include, for example, a display, a loudspeaker, a printer, a communication network, and a remote output device connected to the communication network.

Certainly, for simplicity, FIG. 8 only shows some of components in the electronic device 81 that are related to the present disclosure, and components such as a bus and an input/output interface are omitted. In addition, according to specific application situations, the electronic device 81 may further include any other appropriate components.

Exemplary Computer Program Product and Computer-Readable Storage Medium

In addition to the foregoing methods and devices, the embodiments of the present disclosure may also relate to a computer program product, which includes computer program instructions. When the computer program instructions are executed by a processor, the processor is enabled to perform the steps, of the fatigue state detection method according to the embodiments of the present disclosure, that are described in the "exemplary method" part of this specification.

The computer program product may be program codes, written with one or any combination of a plurality of programming languages, which are configured to perform the operations in the embodiments of the present disclosure. The programming languages include an object-oriented programming language such as Java or C++, and further include a conventional procedural programming language such as a "C" language or a similar programming language. The program codes may be entirely or partially executed on a user computing device, executed as an independent software package, partially executed on the user computing device and partially executed on a remote computing device, or entirely executed on the remote computing device or a server.

In addition, the embodiments of the present disclosure may further relate to a computer-readable storage medium, which stores computer program instructions. When the computer program instructions are executed by a processor, the processor is enabled to execute the steps, of the fatigue state detection method according to the embodiments of the present disclosure, that are described in the "exemplary method" part of this specification.

The computer-readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, apparatus or device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or flash memory) or a flash memory, an optical fiber, a portable compact disk read-only memory (CD-ROM), an optical storage device, a magnetic storage device, or any suitable combination of the above.

Basic principles of the present disclosure are described above in combination with the specific embodiments. However, it should be pointed out that the advantages, superiorities, and effects mentioned in the present disclosure are merely examples but are not for limitation, and it cannot be considered that these advantages, superiorities, and effects are necessary for each embodiment of the present disclosure. In addition, specific details of the above disclosure are merely for examples and for ease of understanding, rather than limitations. The foregoing details do not limit that the present disclosure must be implemented by using the foregoing specific details.

The various embodiments in this specification are all described in a progressive way, and each embodiment focuses on a difference from other embodiments. For same or similar parts among the various embodiments, reference may be made to each other. The system embodiments basically correspond to the method embodiments, and thus are relatively simply described. For related parts, reference may be made to a part of the descriptions of the method embodiments.

The block diagrams of the equipment, the apparatus, the device, and the system involved in the present disclosure are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system may be connected, arranged, and configured in an arbitrary manner. Terms such as "include", "contain", and "have" are open terms, refer to "including but not limited to", and may be used interchangeably with "including but not limited to". The terms "or" and "and" used herein refer to the term "and/or", and may be used interchangeably with "and/or', unless the context clearly indicates otherwise. The term "such as" used herein refers to the phrase "such as but not limited to", and may be used interchangeably with "such as but not limited to".

The method and the apparatus in the present disclosure may be implemented in many ways. For example, the method and the apparatus in the present disclosure may be implemented by software, hardware, firmware, or any combination of the software, the hardware, and the firmware. The foregoing sequence of the steps of the method is for illustration only, and the steps of the method in the present disclosure are not limited to the sequence specifically described above, unless otherwise specifically stated in any other manner. In addition, in some embodiments, the present disclosure may also be implemented as programs recorded in a recording medium. These programs include machine-readable instructions for implementing the method according to the present disclosure. Therefore, the present disclosure further relates to a recording medium storing a program for implementing the method according to the present disclosure.

It should be further pointed out that, various components or various steps in the apparatus, the device, and the method of the present disclosure may be disassembled and/or recombined. These disassembled and/or recombined components or steps shall be regarded as equivalent solutions of the present disclosure.

The foregoing description about the disclosed aspects is provided, so that the present disclosure can be complete or carried out by any person skilled in the art. Various modifications to these aspects are very obvious to a person skilled in the art. Moreover, general principles defined herein may be applicable to other aspects without departing from the scope of the present disclosure. Therefore, the present disclosure is not intended to be limited to the aspect illustrated herein, but to the widest scope consistent with the principles and novel features disclosed herein.

The foregoing description has been given for illustration and description. In addition, this description is not intended to limit the embodiments of the present disclosure to be in forms disclosed herein. Although a plurality of example aspects and embodiments have been discussed above, a person skilled in the art may recognize certain variations, modifications, changes, additions, and sub-combinations thereof.

What is claimed is:

1. A fatigue state detection method, including:
   obtaining image blocks containing an organ area of a target object from a plurality of video frames collected by a camera apparatus disposed in a mobile device, to obtain an image-block sequence that is based on the organ area;
   determining a fatigue state type of the target object based on the image-block sequence;
   sending the image-block sequence to a cloud server if the fatigue state type meets a first preset type, and rendering the cloud server to detect a fatigue level of the target object based on the image-block sequence; and
   receiving fatigue level information about the target object that is returned by the cloud server,
   wherein the obtaining image blocks containing an organ area of a target object from a plurality of video frames collected by a camera apparatus disposed in a mobile device, to obtain an image-block sequence that is based on the organ area includes:
respectively extracting key points for the plurality of video frames collected by the camera apparatus disposed in the mobile device, to obtain face key points of the target object; and
for any video frame in the plurality of video frames, determining the organ area of the target object based on corresponding organ key points in the face key points of the target object in the video frame, and obtaining the image block containing the corresponding organ area of the target object from the video frame;
and wherein the sending the image-block sequence to a cloud server if the fatigue state type meets a first preset type includes:
if the fatigue state type meets the first preset type, sending the image-block sequence and the organ key points of the target object in the plurality of video frames to the cloud server;
wherein the organ key points are used for the cloud server to obtain update information of parameters used by the mobile device to extract the face key points.

2. The method according to claim 1, wherein the method further includes:
if the fatigue state type meets a second preset type, performing an operation corresponding to the second preset type and for reminding the target object to pay attention to driving of the mobile device.

3. The method according to claim 1, wherein the sending the image-block sequence to a cloud server if the fatigue state type meets a first preset type further includes:
if the fatigue state type meets the first preset type, sending the image-block sequence and the face key points of the target object in the plurality of video frames to the cloud server;
wherein the face key points are further used for the cloud server to obtain update information of parameters used by the mobile device to extract the face key points.

4. The method according to claim 1, wherein the determining a fatigue state type of the target object based on the image-block sequence includes:
obtaining confidence for which the target object is respectively at each fatigue level contained in the second preset type based on the image-block sequence; and
determining the fatigue state type of the target object based on a first threshold of each fatigue level, a second threshold of each suspected fatigue level, and the confidence;
wherein the first threshold of the fatigue level is used for determining the fatigue level of the target object, and the second threshold of the suspected fatigue level is used for determining the suspected fatigue level of the target object.

5. The method according to claim 4, wherein the sending the image-block sequence to a cloud server if the fatigue state type meets a first preset type includes:
if the fatigue state type meets the first preset type, sending the image-block sequence and the confidence for which the target object is respectively at each fatigue level contained in the second preset type to the cloud server.

6. The method according to claim 4, wherein
the first threshold of each fatigue level includes a first universal threshold of each fatigue level for a plurality of target objects, or a first dedicated threshold of each fatigue level for a predetermined target object;
the second threshold of each suspected fatigue level includes a second universal threshold of each suspected fatigue level for a plurality of target objects, or a second dedicated threshold of each suspected fatigue level for the predetermined target object;
the method further includes:
respectively performing face recognition on the plurality of video frames, to obtain a face identifier of the target object in the plurality of video frames; and
the determining the fatigue state type of the target object based on a first threshold of each fatigue level, a second threshold of each suspected fatigue level, and the confidence includes:
obtaining the first dedicated threshold of each fatigue level and the second dedicated threshold of each suspected fatigue level that correspond to the face identifier; and
determining the fatigue state type of the target object based on the first dedicated threshold, the second dedicated threshold, and the confidence.

7. A non-transitory computer-readable storage medium, wherein the storage medium stores a computer program used to implement a fatigue state detection method including:
obtaining image blocks containing an organ area of a target object from a plurality of video frames collected by a camera apparatus disposed in a mobile device, to obtain an image-block sequence that is based on the organ area;
determining a fatigue state type of the target object based on the image-block sequence;
sending the image-block sequence to a cloud server if the fatigue state type meets a first preset type, and rendering the cloud server to detect a fatigue level of the target object based on the image-block sequence; and
receiving fatigue level information about the target object that is returned by the cloud server,
wherein the obtaining image blocks containing an organ area of a target object from a plurality of video frames collected by a camera apparatus disposed in a mobile device, to obtain an image-block sequence that is based on the organ area includes:
respectively extracting key points for the plurality of video frames collected by the camera apparatus disposed in the mobile device, to obtain face key points of the target object; and
for any video frame in the plurality of video frames, determining the organ area of the target object based on corresponding organ key points in the face key points of the target object in the video frame, and obtaining the image block containing the corresponding organ area of the target object from the video frame;
and wherein the sending the image-block sequence to a cloud server if the fatigue state type meets a first preset type includes:
if the fatigue state type meets the first preset type, sending the image-block sequence and the organ key points of the target object in the plurality of video frames to the cloud server;
wherein the organ key points are used for the cloud server to obtain update information of parameters used by the mobile device to extract the face key points.

8. The non-transitory computer-readable storage medium according to claim 7, wherein the method further includes:
if the fatigue state type meets a second preset type, performing an operation corresponding to the second preset type and for reminding the target object to pay attention to driving of the mobile device.

9. The non-transitory computer-readable storage medium according to claim 7, wherein the sending the image-block sequence to a cloud server if the fatigue state type meets a first preset type includes:

if the fatigue state type meets the first preset type, sending the image-block sequence and the face key points of the target object in the plurality of video frames to the cloud server;

wherein the face key points are further used for the cloud server to obtain update information of parameters used by the mobile device to extract the face key points.

10. The non-transitory computer-readable storage medium according to claim 7, wherein the determining a fatigue state type of the target object based on the image-block sequence includes:

obtaining confidence for which the target object is respectively at each fatigue level contained in the second preset type based on the image-block sequence; and determining the fatigue state type of the target object based on a first threshold of each fatigue level, a second threshold of each suspected fatigue level, and the confidence;

wherein the first threshold of the fatigue level is used for determining the fatigue level of the target object, and the second threshold of the suspected fatigue level is used for determining the suspected fatigue level of the target object.

11. The non-transitory computer-readable storage medium according to claim 10, wherein the sending the image-block sequence to a cloud server if the fatigue state type meets a first preset type includes:

if the fatigue state type meets the first preset type, sending the image-block sequence and the confidence for which the target object is respectively at each fatigue level contained in the second preset type to the cloud server.

12. The computer-readable storage medium according to claim 10, wherein the first threshold of each fatigue level includes a first universal threshold of each fatigue level for a plurality of target objects, or a first dedicated threshold of each fatigue level for a predetermined target object;

the second threshold of each suspected fatigue level includes a second universal threshold of each suspected fatigue level for a plurality of target objects, or a second dedicated threshold of each suspected fatigue level for the predetermined target object;

the method further includes:

respectively performing face recognition on the plurality of video frames, to obtain a face identifier of the target object in the plurality of video frames; and the determining the fatigue state type of the target object based on a first threshold of each fatigue level, a second threshold of each suspected fatigue level, and the confidence includes:

obtaining the first dedicated threshold of each fatigue level and the second dedicated threshold of each suspected fatigue level that correspond to the face identifier; and determining the fatigue state type of the target object based on the first dedicated threshold, the second dedicated threshold, and the confidence.

13. An electronic device, wherein the electronic device includes:

a processor; and a memory configured to store processor-executable instructions, wherein the processor is configured to read the executable instructions from the memory, and execute the instructions to implement a fatigue state detection method including:

obtaining image blocks containing an organ area of a target object from a plurality of video frames collected by a camera apparatus disposed in a mobile device, to obtain an image-block sequence that is based on the organ area;

determining a fatigue state type of the target object based on the image-block sequence;

sending the image-block sequence to a cloud server if the fatigue state type meets a first preset type, and rendering the cloud server to detect a fatigue level of the target object based on the image-block sequence; and receiving fatigue level information about the target object that is returned by the cloud server, wherein the obtaining image blocks containing an organ area of a target object from a plurality of video frames collected by a camera apparatus disposed in a mobile device, to obtain an image-block sequence that is based on the organ area includes:

respectively extracting key points for the plurality of video frames collected by the camera apparatus disposed in the mobile device, to obtain face key points of the target object; and for any video frame in the plurality of video frames, determining the organ area of the target object based on corresponding organ key points in the face key points of the target object in the video frame, and obtaining the image block containing the corresponding organ area of the target object from the video frame;

and wherein the sending the image-block sequence to a cloud server if the fatigue state type meets a first preset type includes:

if the fatigue state type meets the first preset type, sending the image-block sequence and the organ key points of the target object in the plurality of video frames to the cloud server;

wherein the organ key points are used for the cloud server to obtain update information of parameters used by the mobile device to extract the face key points.

14. The electronic device according to claim 13, wherein the method further includes:

if the fatigue state type meets a second preset type, performing an operation corresponding to the second preset type and for reminding the target object to pay attention to driving of the mobile device.

15. The electronic device according to claim 13, wherein the sending the image-block sequence to a cloud server if the fatigue state type meets a first preset type includes:

if the fatigue state type meets the first preset type, sending the image-block sequence and the face key points of the target object in the plurality of video frames to the cloud server;

wherein the face key points are further used for the cloud server to obtain update information of parameters used by the mobile device to extract the face key points.

16. The electronic device according to claim 13, wherein the determining a fatigue state type of the target object based on the image-block sequence includes: obtaining confidence for which the target object is respectively at each fatigue level contained in the second preset type based on the image-block sequence; and determining the fatigue state type of the target object based on a first threshold of each fatigue level, a second threshold of each suspected fatigue level, and the confidence;
   wherein the first threshold of the fatigue level is used for determining the fatigue level of the target object, and the second threshold of the suspected fatigue level is used for determining the suspected fatigue level of the target object.

17. The electronic device according to claim 16, wherein the sending the image-block sequence to a cloud server if the fatigue state type meets a first preset type includes: if the fatigue state type meets the first preset type, sending the image-block sequence and the confidence for which the target object is respectively at each fatigue level contained in the second preset type to the cloud server.

18. The electronic device according to claim 16, wherein the first threshold of each fatigue level includes a first universal threshold of each fatigue level for a plurality of target objects, or a first dedicated threshold of each fatigue level for a predetermined target object; and
the second threshold of each suspected fatigue level includes a second universal threshold of each suspected fatigue level for a plurality of target objects, or a second dedicated threshold of each suspected fatigue level for the predetermined target object;
wherein the method further includes:
respectively performing face recognition on the plurality of video frames, to obtain a face identifier of the target object in the plurality of video frames; and
the determining the fatigue state type of the target object based on a first threshold of each fatigue level, a second threshold of each suspected fatigue level, and the confidence includes:
obtaining the first dedicated threshold of each fatigue level and the second dedicated threshold of each suspected fatigue level that correspond to the face identifier; and
determining the fatigue state type of the target object based on the first dedicated threshold, the second dedicated threshold, and the confidence.

* * * * *